May 26, 1964  E. L. SEAMAN  3,134,347
SEWING MACHINE FOR BLIND STITCHING BINDING TAPE
Filed May 25, 1960  6 Sheets-Sheet 1

INVENTOR.
EDWARD L. SEAMAN
BY
Byerly, Townsend, Watson & Churchill
ATTORNEYS.

May 26, 1964 E. L. SEAMAN 3,134,347
SEWING MACHINE FOR BLIND STITCHING BINDING TAPE
Filed May 25, 1960 6 Sheets-Sheet 2
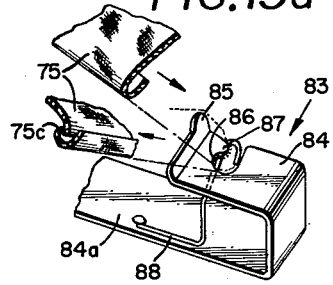
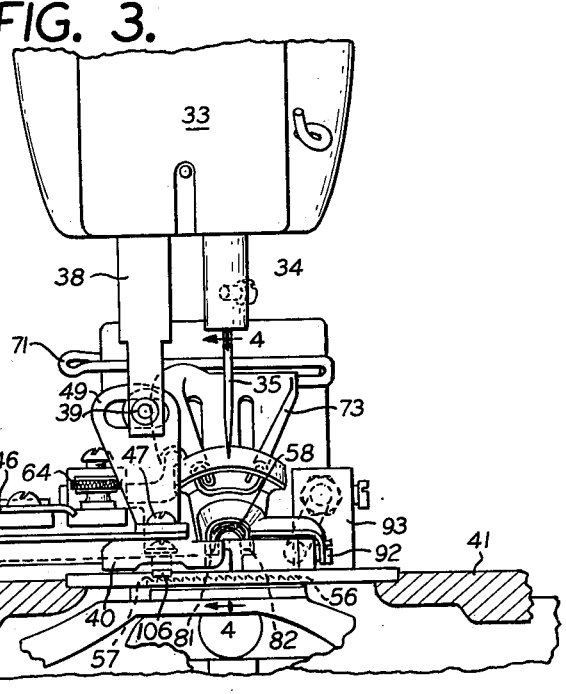
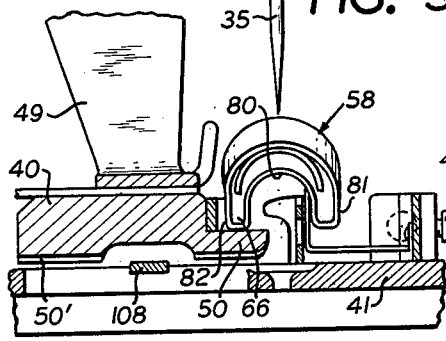
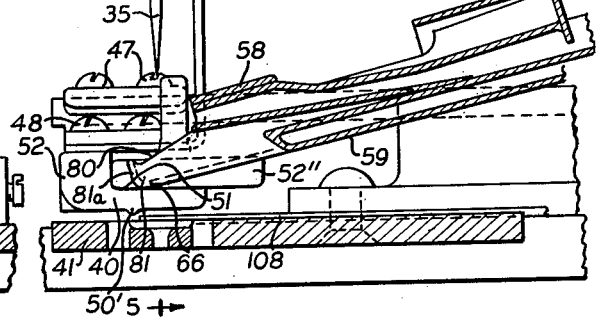
INVENTOR.
EDWARD L. SEAMAN
BY
ATTORNEYS.

May 26, 1964 E. L. SEAMAN 3,134,347
SEWING MACHINE FOR BLIND STITCHING BINDING TAPE
Filed May 25, 1960 6 Sheets-Sheet 3
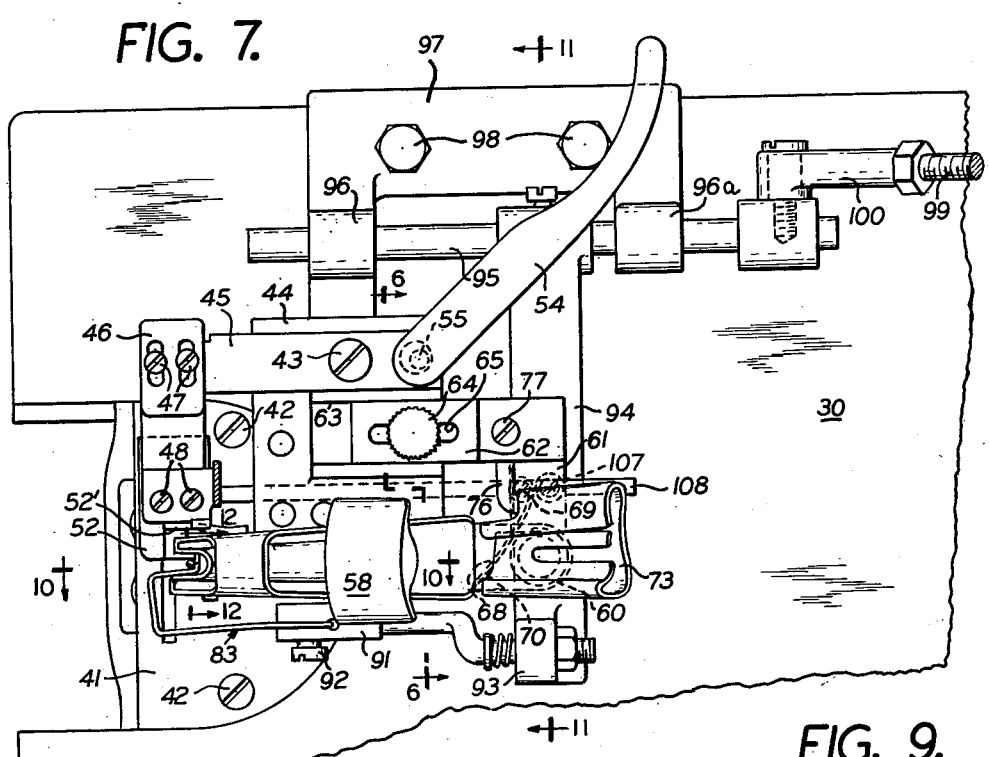
FIG. 7.
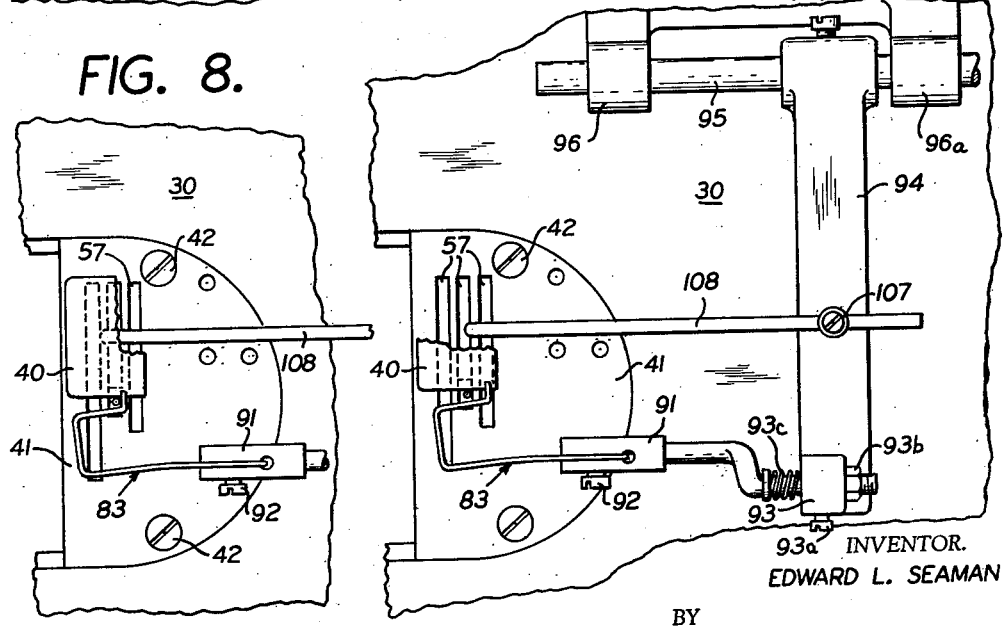
FIG. 8.
FIG. 9.
INVENTOR.
EDWARD L. SEAMAN
BY
Byerly, Townsend, Watson & Churchill
ATTORNEYS.

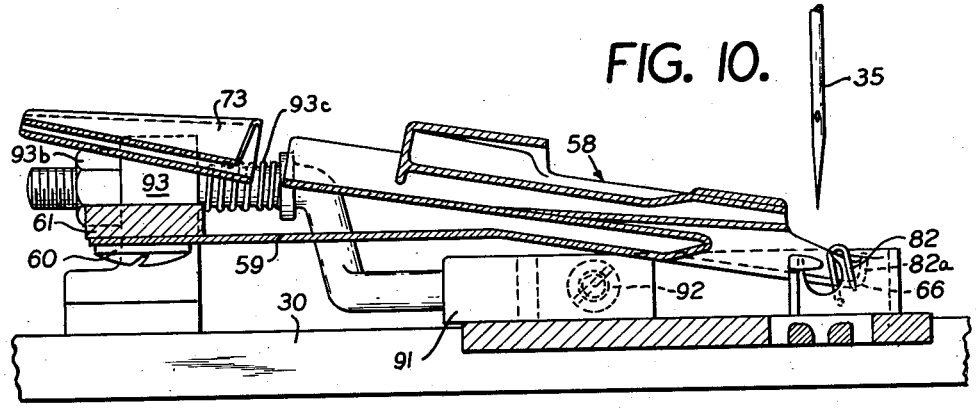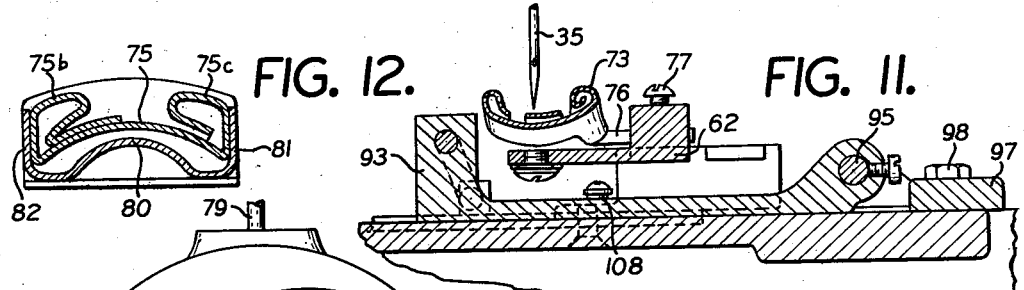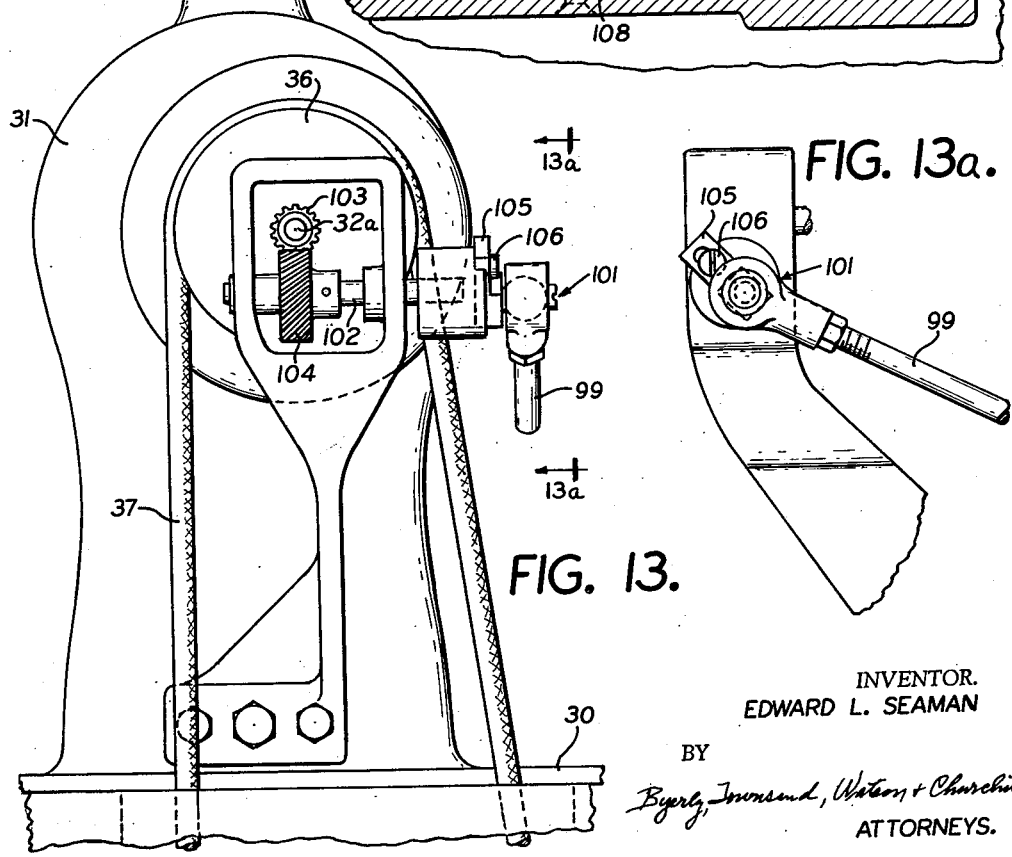

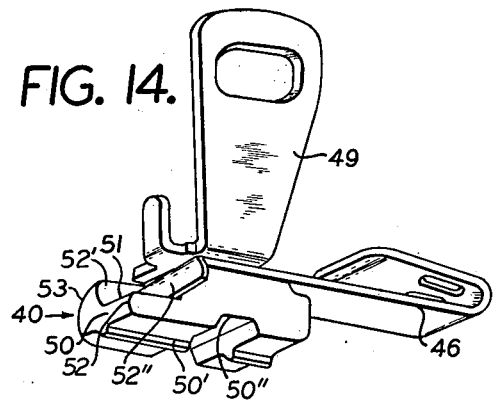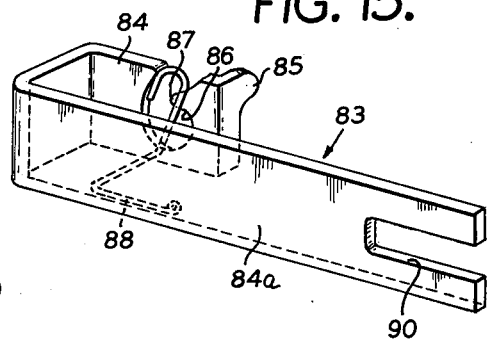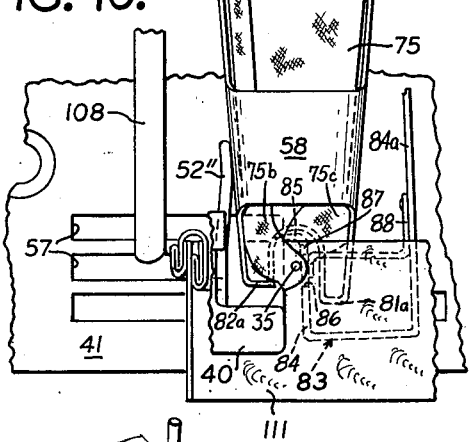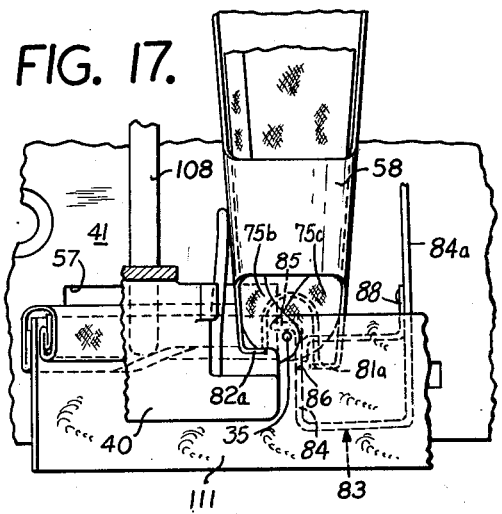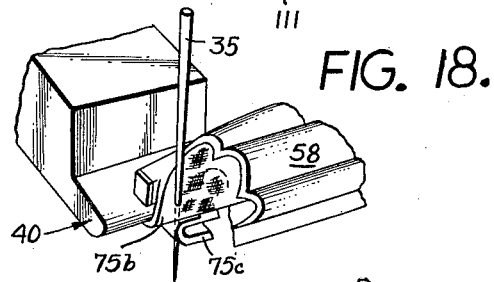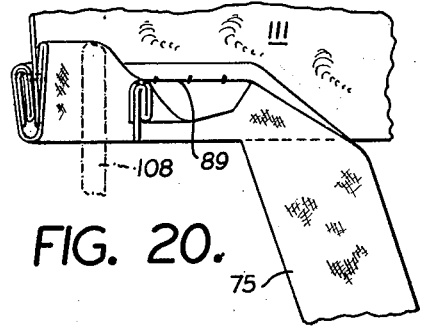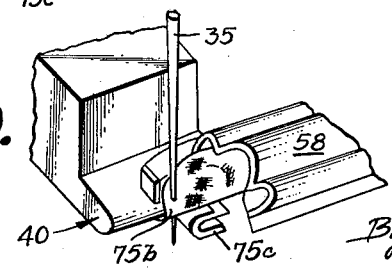

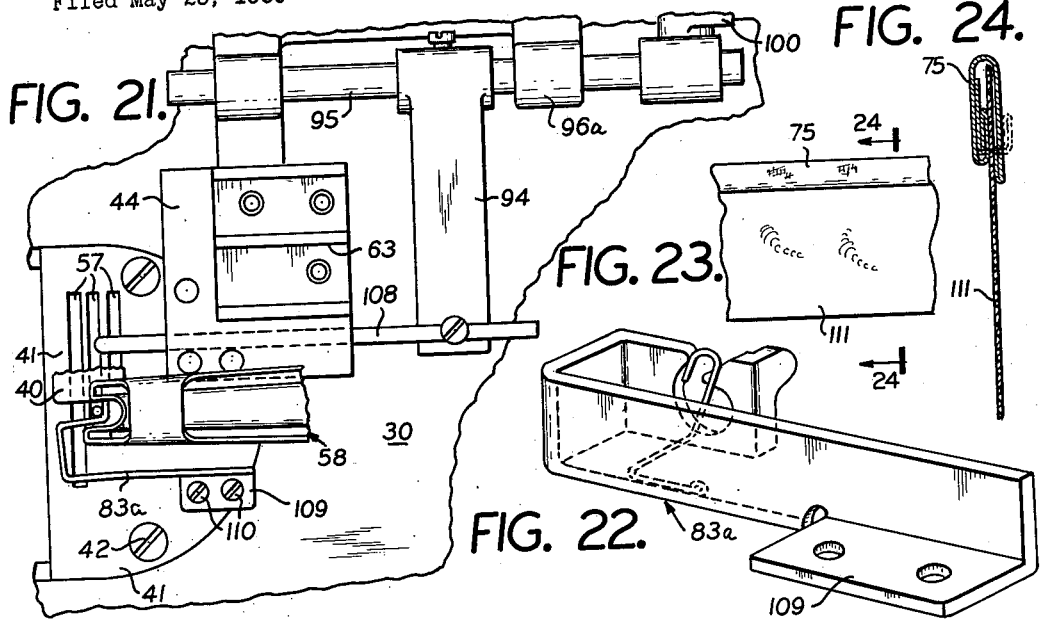
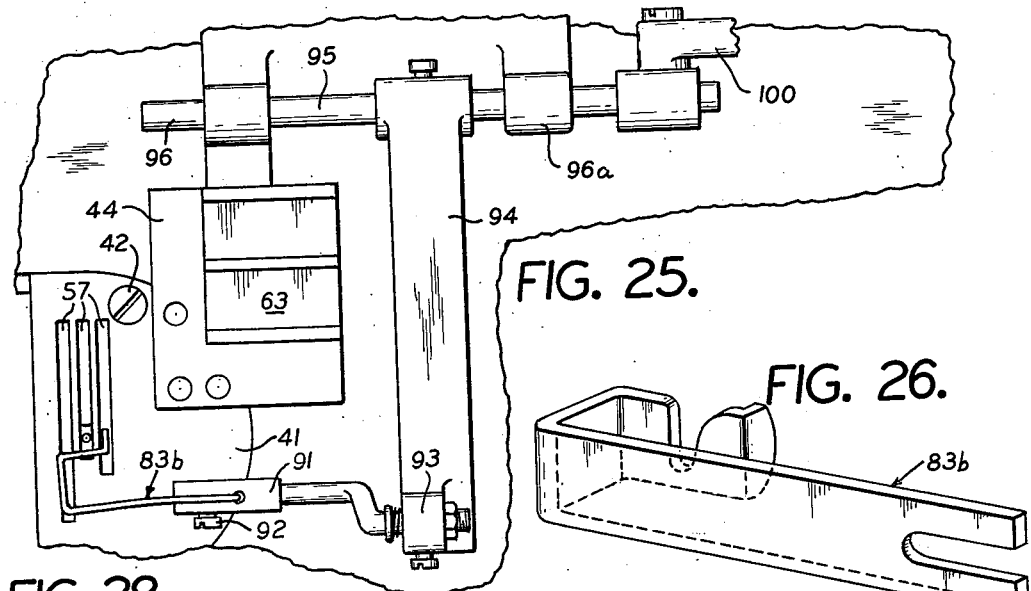
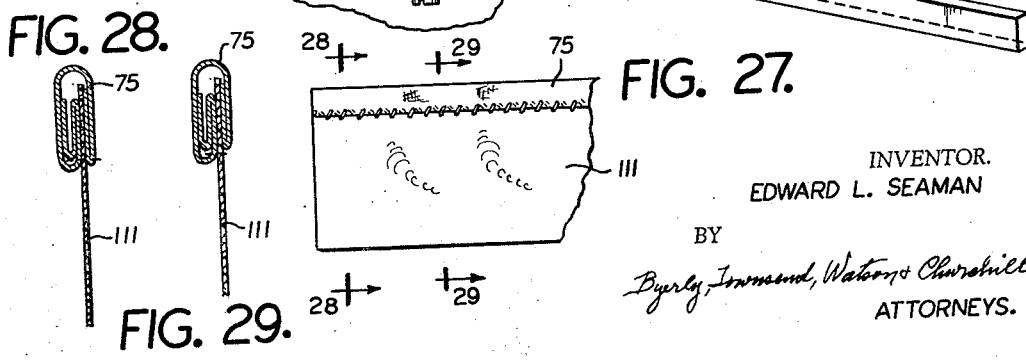

United States Patent Office 3,134,347
Patented May 26, 1964

3,134,347
SEWING MACHINE FOR BLIND STITCHING
BINDING TAPE
Edward L. Seaman, 65 Harvard St., Garden City, N.Y.
Filed May 25, 1960, Ser. No. 31,679
9 Claims. (Cl. 112—140)

The present invention relates to blind stitched piping, the method of, and a machine for producing the same. More particularly, it relates to a so-called blind stitched French piping having no stitches visible on either face and to the method of, and machine for producing such piping and for simultaneously sewing such piping to a supporting fabric.

In prior United States Patents Nos. 1,969,950 and 2,437,977 there are disclosed blind stitched pipings and the methods of, and machines for making the same, in which the stitching is not visible from the front face of the piping but is visible from the rear face or back of the piping. Although such piping has met with considerable favor and acceptance by the trade, nevertheless, the piping on its rear face has the appearance of being machine made and for this reason is not acceptable to the same extent on high quality merchandise as is hand stitch piping wherein no stitching is visible on either face of the piping.

The primary object of the invention is to provide a novel form of piping in which no stitching is visible from either face of the piping.

A further object of the invention is to provide a novel method of producing blind stitched piping.

A still further object of the invention is to provide a relatively simple attachment to a conventional sewing machine or to a zig-zag sewing machine whereby the novel pipings of the present invention can be efficiently produced either as a piping per se or as a piping attached to a base material.

The foregoing and other objects of the invention not specifically enumerated, will become readily apparent from the following detailed description, appended claims, and the accompanying drawings forming part of this specification and in which:

FIG. 3 is a fractional side elevational view of the machine as seen when looking in the direction of the arrows on line 3—3 of FIG. 2.

FIG. 4 is a section taken on line 4—4 of FIG. 3.

FIG. 5 is a section taken on line 5—5 of FIG. 4.

FIG. 6 is a section taken on the line 6—6 of FIG. 7.

FIG. 7 is an enlarged view of the left side portion of FIG. 1.

FIGS. 8 and 9 are detailed fractional plan views of the turning finger, and pusher and flattener elements of the invention in different operative positions.

FIG. 10 is a section taken on the line 10—10 of FIG. 7.

FIG. 11 is a section taken on the line 11—11 of FIG. 7.

FIG. 12 is a section taken on the line 12—12 of FIG. 7, with the binding shown in cross section as it issues from the binding guide and folder, just prior to being turned and passed downwardly through the throat in the end of the binding guide and folder.

FIG. 13 is a side elevational view as seen when looking in the direction of the arrows on line 13—13 of FIG. 2.

FIG. 13a is an elevational view as seen when looking in the direction of the arrows on line 13a—13a of FIG. 13.

FIG. 14 is a perspective view of the presser foot forming part of the invention.

FIG. 15 is a perspective view of the preferred embodiment of the turning finger forming an essential part of the invention.

FIG. 15a is an exploded perspective view taken from beneath the turning finger showing the relationship of the lower fold of the binding tape in passing over the lug and nose on the turning finger.

FIG. 16 is a top plan view, with parts broken away, showing the relationship of the turning finger and the pusher and flattener in the retracted position of said elements.

FIG. 17 is a view similar to FIG. 16 showing the elements in projected position.

FIG. 18 is a perspective view illustrating the relative position of the needle to the folded binding tape when the turning finger is in the position shown in FIG. 17.

FIG. 19 is a perspective view illustrating the relative position of the needle to the folded binding tape when the turning finger is in the position shown in FIG. 16.

FIG. 20 is a bottom plan view of the binding tape as it passes through the machine in the course of being formed into a piping and stitched to a base fabric.

FIG. 21 is a plan view similar to FIG. 9 showing a turning finger similar to that shown in FIG. 16 fixedly mounted on the machine.

FIG. 22 is a perspective view of the turning finger shown in FIG. 21.

FIG. 23 is a top plan view of a piping made with the turning finger shown in FIGS. 21 and 22 stitched to a base fabric.

FIG. 24 is a section taken along the line 24—24 of FIG. 23, and showing by broken lines the relations of the bottom edge fold of the piping before it is flattened out.

FIG. 25 is a view similar to FIG. 21 showing a further embodiment of the invention.

FIG. 26 is a perspective view of the turning finger shown in FIG. 25.

FIG. 27 is a bottom plan view of a piping attached to a base fabric as made with the turning finger shown in FIGS. 25 and 26.

FIGS. 28 and 29 are sections taken respectively on the lines 28—28 and 29—29 of FIG. 7.

Figure 1:
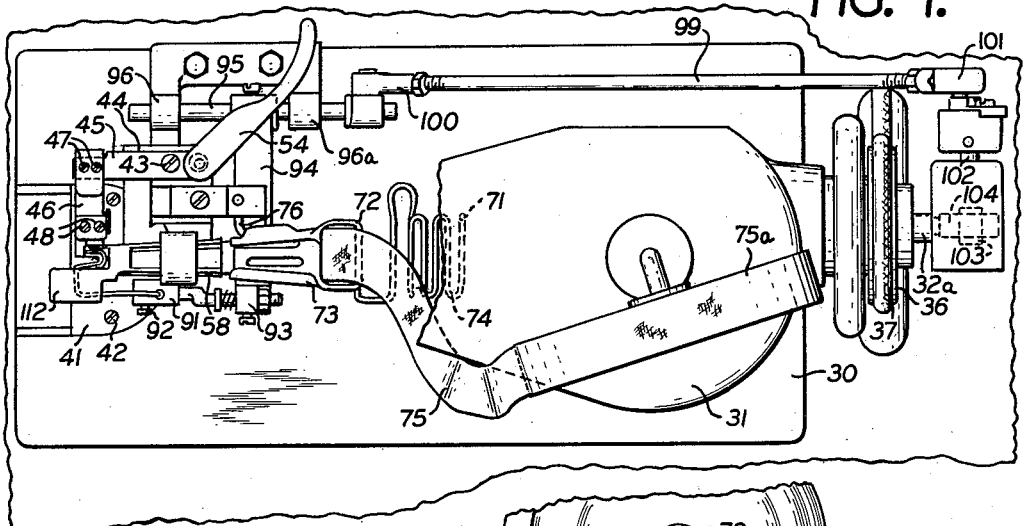
FIG. 1 is a top plan view of a conventional sewing machine with a preferred embodiment of the attachment of the present invention mounted in position thereon, the needle head and part of the overhanging arm of the machine being broken away.
Figure 2:
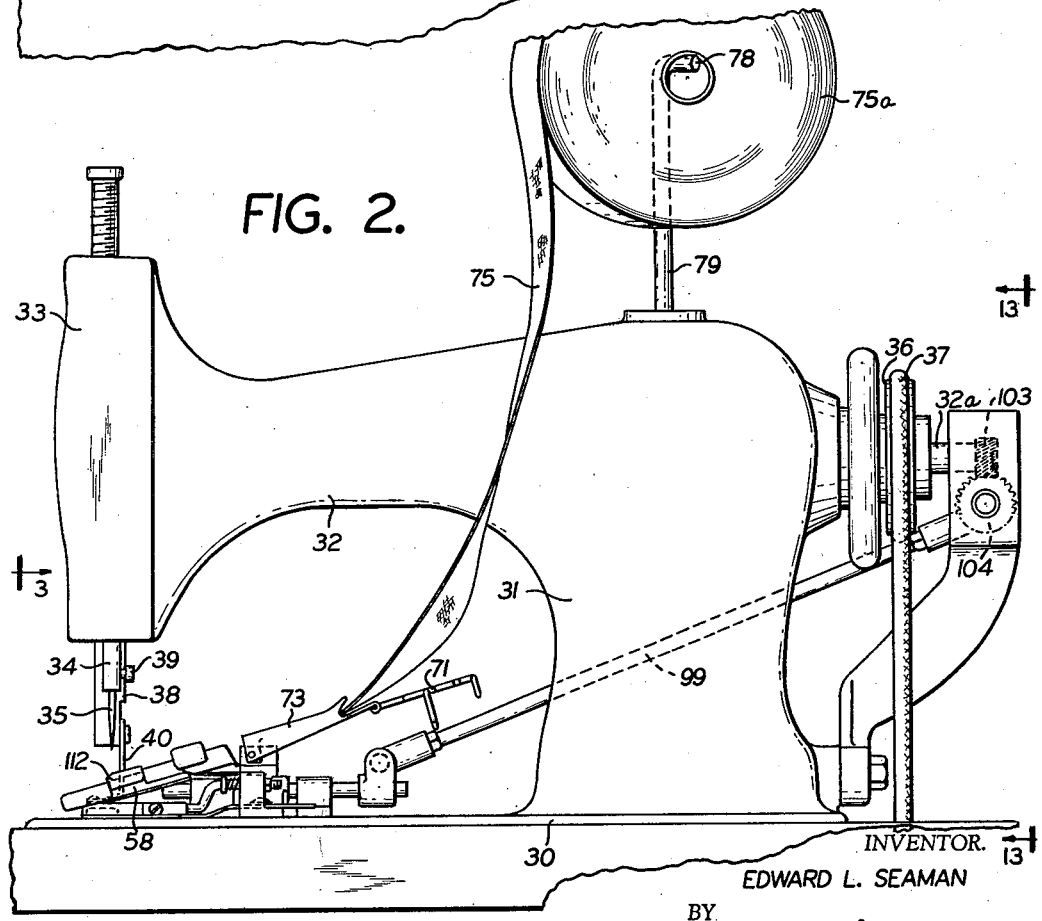
FIG. 2 is a front elevational view of the machine shown in FIG. 1.

Referring to the drawings wherein like reference numerals designate corresponding parts and more particularly first to FIGS. 1 to 20, the reference numeral 30 designates the base of a sewing machine head of a conventional type formed with a standard 31 having an overhanging arm 32 to one end of which is secured a needle-head 33 in which is reciprocable a needle-bar 34 carrying a needle 35. The reciprocable needle-bar 34 may derive its power from any suitable source, as for example, from a drive shaft 32a upon which is fixedly mounted a pulley 36 driven by a belt 37 or in any other manner. Slidably mounted in the needle-head 33 is a presser foot bar 38 which carries a screw 39 adapted to be drawn upwardly by an operating arm (not shown) to move a presser foot 40 into and out of operative position with a workpiece.

The standard presser foot of the conventional sewing machine is removed from its position on the presser foot bar 38 and in place of the regular cover plate provided on the base of the sewing machine, a cover plate 41 (FIGS. 1, 3, 4, 5 and 7) of special construction is substituted and which is secured to the base 30 by any suitable means such as screws 42 and carries the various parts which cooperate with the needle of the sewing machine to produce piping.

Pivoted by a screw 43 on a block 44 mounted on the base 30 is a lever 45, to one end of which is attached a U-shaped spring 46 (FIGS. 1, 3 and 7) by means of screws 47. To the other end of the spring 46 is secured by means of screws 48 the presser foot 40 having a lifting ear 49. The presser foot has an extension 50 (FIG. 14) provided with an upper bearing surface 51 and an outer curved edge 52 adapted to cooperate with the needle 35 in a manner to be later described to permit accurate adjustment of the edge in relation to the needle. The presser foot may also carry a side shield 52' having a rounded front edge 53 to assist in guiding material for stitching and a strong spring 52" providing an abutment for the forward end of the binding guide and folder, presently to be described. The right hand end of lever 45 is provided with suitable means for adjusting it about the pivot screw 43 in opposite directions. This adjustment means comprises a lever 54 having an eccentric stud 55 extending downwardly through the right hand end of lever 45 so that by swinging the lever 54 in one direction or the other the eccentric 55 will correspondingly swing the lever 45 about its pivot to move the free edge 50 of the presser foot extension toward or from the path of travel of the needle 35. Sufficient clearance is provided in the lever 45 either at the screw 43 or at the eccentric 55 to permit the necessary shifting of the lever 45 to take place as the eccentric is rotated. The lever 54 has substantial friction provided by any suitable means, such as by having the pivot screw 43 fairly tight so that the lever 45 readily remains in whatever position it is placed in, to thereby maintain the edge of the extension 50 in adjusted position.

The presser foot 40 is normally pressed downwardly by the spring 46 to cooperate with the toothed feed members 56 (FIG. 3) which extend through suitable slots 57 in the cover plate 41 until said workpiece goes past the needle 35 of the machine in a manner similar to the way goods are fed by the presser foot, which is carried on the presser foot rod on standard sewing machines.

In order to properly fold and supply binding material to the needle to form piping, a binding folder and guide 58 (FIGS. 1 to 5 and 10) is carried by a flat spring member 59 (FIG. 10) which is pivoted by a screw 60, (FIG. 7) to a bar 61 of a slide 62 which is longitudinally adjustable in a slide-way 63 in the block 44 mounted on the cover plate 41 and held in adjusted position by means of a thumb screw 64 which extends through a slot 65 in the slide 62. Thus by suitable adjustment of the slide 62, the binding guide and folder 58 can be adjusted longitudinally to bring its throat end 66 in proper cooperative position with the needle.

The binding guide and folder has its throat end 66 resting upon the surface 51 of the presser foot 40 and is pressed thereagainst by the spring 59. One side of the throat end 66 is normally pressed against the side shield 52' of the presser foot 40 by means of a spring 68 (FIG. 7) which is coiled about a securing screw 69 and has its opposite bent end 70 engaging the spring 59.

A binding guide and tensioning gate 71 preferably made of wire has its forward end 72 secured to a prefolder 73. The tensioning gate 71 is provided with a plurality of reverse bends 74 which provide a plurality of loops, through any desired number of which a binding or binding strip 75 passes on its way to the prefolder 73.

The delivery end of the pre-folder 73 is disposed adjacent the entry end of the binding folder and guide 58. The pre-folder is secured in any appropriate manner to one end of a supporting rod 76 (FIG. 7) which is adjustably mounted in the slide block 62 by a screw 77. The binding may be supplied from a roll of binding 75a (FIG. 2) which may be suitably mounted on a spindle 78 carried by a bracket 79 mounted on the overhanging arm 32.

The pre-folder 73 and the binding folder and guide 58 are of such constructions and so related that they will fold the binding 75 fed therethrough first into the form of an inverted U, then into the form of a W and finally into the form of a U with the edges of the legs of the U turned inwardly to provide a top edge fold 75b and a bottom edge fold 75c with the outer edge of the top edge fold extending beyond the outer edge of the bottom edge fold as shown in detail in FIGS. 22 to 27 of Patent No. 1,969,950. It is to be noted that the binding folder and guide 58 (FIG. 5) at its throat is provided with a curved edge 80 which slopes oppositely downward toward and below the top of side plates 81 and 82 at the forward end of the spring 59 (FIGS. 3, 4, and 10) thereby tending to cause the folds of the binding as they pass downwardly through the throat 66 to slide along the curved edge 80 and below the end plates 81a and 82a (FIGS. 4, 10 and 17), which act as limiting abutments to hold the extreme edges of the folded binding in proper feeding positions as shown more in detail in United States Patent No. 1,969,950. The basic construction of machine and attachment as thus far described substantially corresponds to that disclosed for the corresponding parts in United States Patent No. 1,969,950 and per se does not form part of the present invention.

According to the present invention as embodied in FIGS. 1–24 of the drawings, means are provided for forming piping in which no stitching is visible from either face of the piping. The means for forming a blind stitch in the top edge fold 75b of the binding is substantially the same as that disclosed in the aforementioned patent. The means for forming a blind stitch in the bottom edge fold 75c comprises a turning finger 83 (FIG. 15) which is disposed laterally adjacent the presser foot extension 50 and the needle 35. As shown in FIGS. 15, 15a, 16, 17 and 22 the turning finger consists of a U-shaped member having a short arm 84 and a long arm 84a, the short arm having at its free end an off-set lug 85 for engaging the folded binding intermediate the edge folds thereof where said folded binding enters the throat 66 of the folder 58. The short arm 84 of the turning finger has a curved slot 86 therein extending downwardly from the top edge of said arm, one edge of the slot being formed with a nose 87 disposed in the slot and over which nose the bottom edge fold 75c is caused to move as the binding is drawn downwardly through the throat and under the presser foot. To insure such folded engagement of the bottom edge fold over the nose, said folded edge as it passes over the nose is held by a spring 88 which is formed of wire and has one end secured, as by soldering, to the inner face of the long arm 84a then extends across the open bottom of the turning finger and then extends upwardly to engage the inner face of the nose and across the slot 86.

The free end of the long arm 84a of the finger 83 is formed with a slot 90 and is mounted and clamped in a slotted end of a carrier member 91 by a screw 92, said carrier member being in turn adjustably mounted in an upstanding lug 93 formed on an arm 94 and held therein by a set screw 93a. Alternately, the adjustment of the carrier member 91 in the lug 93 may be provided by a stop nut 93b and a spring 93c on an end of said carrier member straddling the lug 93 (FIGS. 7 and 9).

The arm 94 is mounted for reciprocable movement perpendicularly to its length by having one end thereof fitted onto and secured to a slide rod 95 mounted in slide bearings 96, 96a formed in a bracket 97 which may be integral with the block 44 and secured to the machine base by bolts 98. Reciprocable movement is imparted to the slide rod 95 by a connecting rod 99, one end of which is connected to the slide rod by a pitman 100 and the other end of which is connected to a variable eccentric mounting 101 on a stub shaft 102 which is rotatable by the driving shaft 32a of the machine through spiral gears 103 and 104 (FIGS. 1, 2, 13 and 13a). The eccentricity of the mounting 101 may be altered by adjustment of a slide 105 and setting of a set screw 106 to vary or adjust the throw or axial movement of the slide rod 95 and with it the carrier member 91 and the turning finger 83. The turning finger 83 is mounted for reciprocatory movement relative to the throat of the binding folder and guide 58 so that the short arm 84 of the turning finger is movable substantially along the medial plane of the throat in close proximity to the needle 35, with the lug 85 extending across said medial plane and with the top edge of the short arm slightly below the top of the throat.

Mounted by a screw 107 on the arm 94 to extend perpendicularly thereto is a flattener and pusher member 108 (FIGS. 3, 4, 6 to 9, 16, 17 and 21) the function for which will presently be described.

In the embodiment shown in FIGS. 21 and 22, the turning finger 83a instead of being reciprocable with the arm 94 is fixedly mounted on the cover plate 41 to be stationary, by a bracket 10 and screws 110.

In the embodiments shown in FIGS. 25 and 26, the turning finger 83b, although mounted for reciprocation, it is not formed with a nose or a biasing spring for a purpose to be presently described.

Operation: The binding tape 75 is fed from the roll 75a either through the binding guide and tensioning gate 71 to the pre-folder 73 or directly to the pre-folder whereby the longitudinal edge portion which is to form the top edge fold 75b is turned over and inwardly of the binding material. From the pre-folder 73 the folded binding is fed through the binding folder and guide 58 where the binding is folded first into an inverted U, then into a W and then into a U with the legs thereof inturned as shown in FIG. 12. As the longitudinally folded binding emerges from the binding folder and guide 58, the binding is bent downwardly through the throat 66, the top edge fold 75b directly enters the throat while the bottom edge fold 75c is caused to move over the lug 85 and then through the open top of the slot 86 and over the nose 87, whereby said bottom edge fold is folded outwardly to provide the bight 89. This action is aided by the spring 88 which maintains the outwardly folded portion of the bottom edge fold in said relation (FIGS. 18 and 19). As this action is taking place the top edge fold 75b is simultaneously being drawn downwardly through the throat 66. In the course of this movement the end plates 81a and 82a at the free end of the folder and guide 58 act as limiting abutments to hold the top edge fold 75b and the bottom edge fold 75c in proper feeding position.

After passing downwardly through the throat and over the turning finger, the binding passes to the left (FIGS. 16 and 17) beneath the presser foot 40. The binding will now be seen to be shaped with four plies in the top edge fold and four plies in the bottom edge fold, two plies of said latter fold being provided by the reversely folded portion formed with the bight 89. In order to sew the piping with a blind stitch the needle 35 in each of its down thrusts is made to pass through only the inner two plies of the top edge fold (FIGS. 18 and 19). As this is taking place, the turning finger is moving alternately from its retracted to its projected position and presenting the bight 89 of the bottom edge fold alternately to the path of the needle. This produces a blind stitch in the top edge fold and a stitch visible at the bight in the bottom edge fold. This latter visible stitch is then concealed by unfolding or restoring the reversely folded ply of the bottom edge fold to its pre-reversely folded form in the following manner. As the thus produced piping moves under the presser foot the top of the top edge fold 75b is guided by a rib 50′ on the under side of the presser foot, which rib is traversed by a slot 50″ through which the free end of the pusher and flattener member 108 is reciprocable in unison with the reciprocation of the turning finger 83 and successively engages the bottom fold 75c to unfold the reversely folded ply and flatten it to produce a finished piping as shown at the left of FIG. 20.

Where the piping is to be sewed upon a base fabric or workpiece 111 (FIGS. 16, 17 and 20) the latter is passed along a guide 112 (FIGS. 1 and 2) which is attached in any suitable way, as for example by soldering, to the side of the binding folder and guide 58. The base fabric passes downwardly between the inner plies of the top edge fold and bottom edge fold and then takes a right angle turn to the left to pass beneath the presser foot in a manner well known.

The edge 52 of the extension 50 of the presser foot normally extends within the throat a short distance (FIG. 5) thus restricting the width of the throat. The edge 52 is made to extend past the edge of the throat in the manner described to insure accurately positioning the layers of piping with respect to the needle for accurate and proper sewing of the piping. When using the needle 35 of the usual tapered form, the needle is sprung somewhat to one side by the edge 52 each time that it passes downwardly through the piping. The binding guide and folder 58 being pivoted at 60 (FIGS. 7, 10 and 11) is permitted to spring away from the edge 52 when a seam or other thick place is encountered in the base fabric to which the piping is being stitched. As such a seam passes downwardly through the throat, it causes the guide and folder 58 to spring outwardly to produce an effective enlargement of the throat to permit the seam to pass readily without breakage of the needle. As soon as the seam has passed the throat, the spring 68 returns the guide and folder 58 to its normal operating position.

Where it is desired to provide a fuller piping, a soft large bulk filler thread of wool or man-made fibres may be fed with the binding to occupy a position preferably in the nip of the fold in the bottom edge fold 75c.

In the embodiment of the invention illustrated in FIGS. 21–24, wherein the turning finger 83a is fixedly mounted on the machine base, said turning finger is so mounted in relation to the needle and presser foot as to present the folds in the inner plies of the top edge fold 75b and in the bight 89 of the bottom edge fold in substantially overlying relation to the path of travel of the needle 35 so that the needle will at every thrust pass through both the inner plies of the top edge fold and the bight of the bottom edge fold as shown by the broken lines on FIG. 24 after which the visible stitches through the bight will be concealed by unfolding and restoring the reversely folded ply of the bottom edge fold to its pre-reversely folded form by the action of the pusher and flattener 108 as hereinbefore explained with respect to the embodiment shown in FIGS. 16–20.

In the embodiment of the invention illustrated in FIGS. 26–29, although the turning finger 83b is not designed to reversely fold the bottom edge fold of the binding to provide a bight therein, said turning finger is mounted for reciprocation relatively to the presser foot and needle for alternately presenting the bottom edge fold to the thrust of the needle, whereby a blind stitch piping is produced on which the stitches are only visible on the bottom face of the piping. Of course in said embodiment, no pusher and flattener is required.

Although I have shown and described three embodiments of the turning finger of my invention, it is to be understood that any of said turning fingers may be employed in conjunction with the other operative mechanism disclosed depending upon the characteristics of the binding and base fabric to be used and the final products desired to be produced. It should also be understood that changes in the details of construction and arrangement of the various parts may be resorted to within the range of mechanical and engineering skill without departing from the spirit of the invention as herein claimed.

What I claim is:

1. In a sewing machine for stitching binding, comprising a base, a standard having an arm overhanging the base and provided with a needle head carrying a reciprocable needle, means including a driving shaft for reciprocating said needle, a presser foot, having an edge for guiding a binding into a position to be stitched, a folder mounted on said base for folding a binding longitudinally thereof with the opposite edges turned inwardly to form a top edge fold and a bottom edge fold each having a plurality of plies, said folder having a throat adjacent the path of travel of the needle, the throat and presser foot being so related that a binding upon emerging from the throat and being fed to the presser foot for stitching will be angularly bent so that the needle at each reciprocation thereof will pass through the inner ply of at least one fold, the improvement which comprises means independent of the presser foot for engaging the other edge fold of a binding as it enters the throat of the folder for selectively controlling said other engaged edge fold for moving it into or out of the path of travel of the needle.

2. A sewing machine according to claim 1, wherein the means for engaging said other edge fold of a binding is reciprocable substantially parallel to the path of travel of the binding through the folder to alternately present said engaged other edge fold into and out of the path of travel of the needle.

3. A sewing machine according to claim 1, wherein the means for engaging said other edge fold of a binding is a slotted finger having a free end formed with an offset lug for controlling the movement of said other edge fold during its movement through the throat.

4. A sewing machine according to claim 3, wherein one edge of the slotted finger has a nose disposed in the slot and over which nose said other edge fold which is directed over the lug is caused to move as the binding is fed under the presser foot, a spring biased to seat across the slot and engage the inner face of the nose to fold outwardly said other edge fold as it passes over the nose.

5. In a sewing machine for stitching binding to form a piping, comprising a base, a standard, an overhanging arm, a needle head carrying a reciprocable needle, a presser foot, having an edge which guides a binding into a position to be blind stitched, a folder mounted on said base for folding a binding longitudinally thereof with the opposite edges turned inwardly to form a top edge fold and a bottom edge fold, said folder having a throat adjacent the path of travel of the needle, the throat and presser foot being so related that the binding upon emerging from the throat and being fed to the presser foot for stitching will be angularly bent, the improvement which comprises a turning finger for engaging the binding intermediate the edge folds thereof where said folded binding enters the throat and for folding longitudinally outward said engaged edge fold to produce a bight portion therein, for engagement by the reciprocable needle and means in the path of the stitched binding beyond the needle for unfolding the bight portion to conceal the stitches therein.

6. A sewing machine according to claim 5, wherein the means for unfolding the bight portion is a flat strip movable transversely to the movement of the stitched bight portion and means for reciprocating said flat strip in timed relation to the movement of said binding through the machine.

7. A sewing machine according to claim 5, wherein means are associated with the turning finger to reciprocate it to selectively present the bight portion to the path of travel of the needle and the means for unfolding the bight portion is a flat strip reciprocably movable transversely to the movement of the stitched bight portion and is operable in unison with the means for reciprocating the turning finger.

8. In a sewing machine for sitching binding to form a piping, comprising a base, a standard, an overhanging arm, a needle head carrying a reciprocable needle, a presser foot, having an edge which guides a binding into a position to be blind stitched, a folder mounted on said base for folding a binding longitudinally thereof with the opposite edges turned inwardly to form a top edge fold and a bottom edge fold, said folder having a throat adjacent the path of travel of the needle, the throat and presser foot being so related that the binding upon emerging from the throat and being fed to the presser foot for stitching will be angularly bent, the improvement which comprises a turning finger for engaging the binding intermediate the edge folds thereof where said folded binding enters the throat and for folding longitudinally outward said engaged edge fold to produce a bight portion therein, for engagement by the reciprocable needle means associated with the turning finger to reciprocate it to selectively present the bight portion to the path of travel of the needle, and means in the path of the stitched binding beyond the needle for unfolding the bight portion to conceal the stitches therein, the means for unfolding the bight portion is a flat strip reciprocably movable transversely to the movement of the stitched bight portion and is operable in unison with the means for reciprocating the turning finger.

9. A sewing machine according to claim 6, wherein the presser foot has on its underface an abutment shoulder extending in the direction of the stitched formed piping beyond the needle for engaging and guiding the piping and a groove transverse to said abutment shoulder for receiving the reciprocable flat strip for unfolding the bight portion of the binding.

References Cited in the file of this patent

UNITED STATES PATENTS

| | | |
|---|---|---|
| 1,403,135 | Tate | Jan. 10, 1922 |
| 1,800,409 | Schuebach | Apr. 14, 1931 |
| 1,969,950 | Seaman | Aug. 14, 1934 |
| 2,006,243 | Jekulaitis | June 25, 1935 |
| 2,113,950 | Seaman | Apr. 12, 1938 |
| 2,437,977 | Seaman | Mar. 16, 1948 |